United States Patent [19]

Rock et al.

[11] Patent Number: 6,004,451

[45] Date of Patent: Dec. 21, 1999

[54] ELECTROCHEMICAL DECOMPOSITION OF SOIL AND WATER CONTAMINANTS IN SITU

[75] Inventors: Peter A. Rock; William H. Casey; R. Bryan Miller, all of Davis, Calif.

[73] Assignee: The Regents of the University of California, Oakland, Calif.

[21] Appl. No.: 09/031,218

[22] Filed: Feb. 26, 1998

[51] Int. Cl.[6] .................................................. C02F 1/461
[52] U.S. Cl. ........................ 205/687; 205/688; 205/742; 205/766; 205/771; 204/515; 588/204
[58] Field of Search .................................. 205/687, 688, 205/742, 766, 771; 204/515; 588/204

[56] References Cited

U.S. PATENT DOCUMENTS

| | | |
|---|---|---|
| 3,640,821 | 2/1972 | Sweeny et al. . |
| 3,737,384 | 6/1973 | Sweeny et al. . |
| 3,767,782 | 10/1973 | Sweeny et al. . |
| 3,767,783 | 10/1973 | Sweeny et al. . |
| 3,871,906 | 3/1975 | Sweeny et al. . |
| 3,873,346 | 3/1975 | Sweeny et al. . |
| 4,219,419 | 8/1980 | Sweeny . |
| 4,382,865 | 5/1983 | Sweeny . |
| 4,585,533 | 4/1986 | Habeeb . |
| 5,411,664 | 5/1995 | Seech et al. . |
| 5,480,579 | 1/1996 | Seech et al. . |
| 5,531,865 | 7/1996 | Cole ......................................... 205/751 |
| 5,595,644 | 1/1997 | Doring et al. ........................... 205/766 |
| 5,616,235 | 4/1997 | Acar et al. ............................... 204/515 |

OTHER PUBLICATIONS

J.E. Barbash et al., *Biogenic Sulfur in the Environment*, Chap. 8 (1989) pp. 101–138.
T. Boronina et al., *Environmental Science & Technology* (1995) 29(6): 1511–1517.
C.S. Criddle et al., *Environmental Science & Technology* (1991) 25(5): 973–978.
S.V. Ho et al., *Environmental Science & Technology* (1995) 29(10): 2528–2534.
W.S. Orth et al., *Environmental Science & Technology* (1996) 30(1): 66–71.
W. Roush, "Building a Wall Against Toxic Waste," *Science* (Jul. 28, 1995) 269: 473.
K. Schmidt, "'Lasagne' Gobbles Up Toxic Wastes," *New Scientist* (Feb. 19, 1994) p. 20.

*Primary Examiner*—Arun S. Phasge

[57] ABSTRACT

Halogenated organics contaminating soil formations are decomposed by an applied voltage-enhanced Grignard reaction with metallic magnesium, either pure or in alloy form, that has been lowered into the soil formation, in conjunction with hydrolysis of the resulting organomagnesium halide to release the halogen from the starting contaminant. Renewal of the magnesium surface to permit an enhanced decomposition is achieved by connection of the magnesium electrode to an electric potential generator and applying the potential either continuously or in pulse-wise manner, preferably repeatedly reversing the applied potential to electrochemically clean the magnesium-containing electrode surface. Dissolved Cr(VI) is likewise reduced to chromium of lower oxidation states and thus rendered less toxic.

19 Claims, 5 Drawing Sheets

ELECTROCHEMICAL DECOMPOSITION OF SOIL AND WATER CONTAMINANTS IN SITU

BACKGROUND OF THE INVENTION

1. Field of the Invention

This invention relates to soil and groundwater remediation, and in particular the in situ removal of halogenated hydrocarbons and other organohalides as well as Cr(VI) that contaminate soil formations and the fluids present in the formations.

2. Description of the Prior Art

Concern about the contamination of soils and groundwater is continually increasing owing to the effect of the contaminants on the quality of life and the environment, and the limitations that they impose on the use of land and on the conversion of unused or underutilized land sites to useful purposes. Fuel dumps, military waste sites, landfills, and other hazardous waste sites in general are among those that are contaminated, and halogenated organic compounds and Cr(VI) are among the most prominent of the contaminants. A source of Cr(VI) is dichromate, which was formerly in common use as a cleaning agent among chemistry laboratories and as a result is now a common contaminant at laboratory sites. Many halogenated organic compounds are known carcinogens, mutagens or both, forming underground plumes that migrate into water wells and aquifers, while Cr(VI) has been implicated in tubular necrosis of the kidney, allergic reactions and dermatitis, and reproductive toxicity, and is a possible carcinogen and mutagen. The removal of these contaminants is considered critical to the remediation of soil and groundwater.

Groundwater can be removed from the soil and treated aboveground for decontamination prior to use, and soil can likewise be excavated and treated aboveground. The more preferred methods of remediation, however, are those that are performed in the soil formation itself (i.e., "in situ"), because these methods offer a lower cost, less disruption to the environment, and less exposure of workers to the contaminants, than above-ground treatment methods. Effective remediation is not always achieved by in situ methods, however. One in situ method is microbial degradation, either biotic or abiotic. Unfortunately, many halogenated organic compounds are not rapidly metabolized by bacteria. For this reason, methods of promoting reductive dehydrohalogenation by the bacteria have been attempted. Unfortunately, the products of reductive dehydrohalogenation are often toxic as well, and in some cases more so than the original contaminants. Another in situ method is the use of electrokinetics, in which an electric current is passed through the soil to cause the water to migrate due to electroosmosis. The migration draws the water from one layer of the formation into a different layer where decontamination is supposedly easier to achieve, but the flow rate is very slow and the process still requires a method for the decontamination. A third in situ method is soil-vapor extraction, in which the contaminants are drawn as vapors from the vadose section of the soil formation above the water table. Contaminants dissolved in the groundwater or in organic matter then vaporize to replenish the contaminants that were removed from the vapor in a continuous vaporization and extraction process. The vaporization step is a limiting step, however, and the process requires drawing a vacuum on the soil formation and maintaining air flow through the formation toward the extraction point(s). Furthermore, workers above ground risk exposure to the contaminants as they reach the surface.

A fourth in situ method that has been disclosed is reductive dehalogenation by the use of metals in the soil. Magnesium has been cited as a metal for possible use in this type of process. A disclosure of the process appears in Seech et al., U.S. Pat. No. 5,480,579 (Jan. 2, 1996). The difficulty with processes of this type is that the magnesium metal surface becomes contaminated with oxidized magnesium compounds in which the magnesium is no longer functional in the dehalogenation reaction owing to its oxidized state and which block access to the reactive magnesium metal, thereby greatly decreasing the rate and extent of further dehalogenation.

SUMMARY

It has now been discovered that halogenated organics and dissolved Cr(VI) that contaminate soil formations and groundwater can be decomposed in situ by placing a pair of electrodes in the wet soil formation or groundwater, one of the electrodes having at least a surface of metallic magnesium, and imposing an electric potential between the magnesium electrode and the other (i.e., the counter) electrode. The applied potential is of sufficient voltage to both enhance the reactions between magnesium metal and the organohalides or Cr(VI) ion and to either periodically or continuously remove any magnesium compounds formed at the electrode surface. In decomposing halogenated organics, it is often beneficial to periodically reverse the polarity of the potential to electrochemically clean the magnesium containing electrode surface, to drive an electrochemical reaction that displaces oxidized forms of magnesium formed at the electrode surface. The repeated or continuous renewal of the magnesium surface permits the Grignard reaction to proceed until all bound halogen in the contaminant is released from the contaminant.

This invention offers the advantage of decomposing organohalides, reducing dissolved Cr(VI), or both, in groundwater or soil formations, without requiring the removal of either solid, liquid or gas from the formation. The invention achieves this result without the addition of any chemical solutions or microorganisms to the soil. The extent of reaction is not limited by the exposed surface area of the magnesium, and the process requires nothing more than an electric potential to sustain the process until the contaminant is fully decomposed. The rate of decontamination is greater however when using magnesium electrodes of greater surface area.

The magnesium electrode can assume a variety of shapes and forms, including various flow-through structures or arrays that extend over a wide area in the soil formation, and the electric potential can be imposed in a variety of profiles and protocols, depending on the type and level of contaminants and the composition, consistency and ambient condition of the contaminated formation. These and other features, embodiments, and advantages of the invention are set forth in further detail below.

DETAILED DESCRIPTION OF THE INVENTION AND PREFERRED EMBODIMENTS

Figure 1:
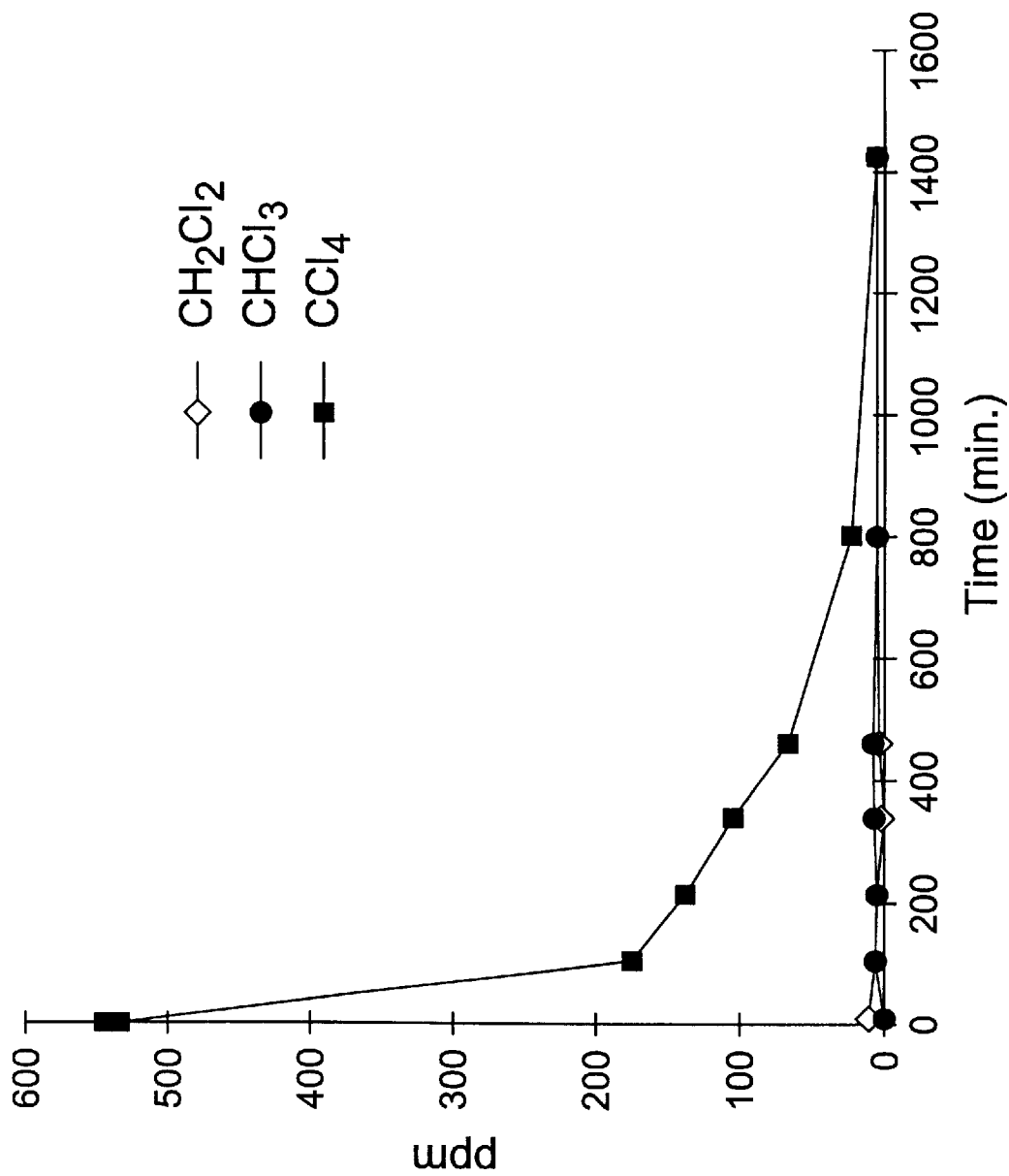
FIG. 1 is a plot of carbon tetrachloride concentration vs. time in an aqueous solution in an experiment utilizing the process of the present invention.

In one aspect, this invention resides in a sequence of reactions beginning with the conversion of halogenated organic compounds to organomagnesium halides by a Grignard reaction with metallic magnesium, followed by hydrolysis of the organomagnesium halides to a product mixture in which each organomagnesium halide has been converted to the dehalogenated analog of the starting organohalide, i.e., the original organohalide minus one halogen atom. In subsequent Grignard and hydrolysis reactions, multi-halogenated compounds (such as chloroform, for example) are further dehalogenated by the magnesium electrode and water to remove additional halogen atoms until all halogen atoms on the starting materials have been replaced by hydrogen atoms. In these reactions, the magnesium leaves the organomagnesium halide as a complex magnesium salt (HOMgCl); and there is a competing reaction in which the magnesium metal reacts directly with water to form magnesium hydroxide ($Mg(OH)_2$). In both the magnesium salt and the magnesium hydroxide, the magnesium is in the +2 oxidation state and thereby inactive in a Grignard reaction. These and other contaminants produced by the reaction or otherwise deposited on the magnesium electrode surface are referred to herein as "non-metallic contaminants." This term refers to compounds of metals in an oxidation state other than zero, as well as any non-metal-containing compounds that might also deposit on the electrode surface.

In another aspect, this invention resides in the reduction of dissolved chromium ion from the oxidation state of 6, i.e., Cr(VI), to a lower and relatively non-toxic oxidation state, notably Cr(II) and Cr(III).

In reference to the electrochemical reaction, the term "metallic electrode" is used at various locations in this specification to denote the electrode containing metallic magnesium, and encompasses any configuration of such an electrode that is capable of connection to an electric potential and thereby of serving as an electrode. This includes single rods, plates, loops, and the like, as well as arrays of two or more rods, plates, or loops, and grids such as mesh structures and lattice structures. In preferred arrangements, the metallic electrode is a combination of individually placed rods, plates, grids or loops, that are positioned to extend over an effective treatment region that encompasses an entire region where an underground contaminant plume is expected to reside or to flow or migrate into. In most cases, the most effective results will be achieved by arrays or grids of electrode structures that permit liquid and vapor to flow through, thereby decomposing the halogenated hydrocarbons and reducing the Cr(VI) present in the flowing or migrating liquid or vapor.

Many soil formations contain a saturated zone (at and below the water table) and a vadose zone (the porous soil zone above the water table, in which the gas space is occupied by water vapor and contaminant vapors), and often a capillary zone (a shallow zone directly above the water table beneath the vadose zone, in which liquid water is drawn up from the saturated zone by capillary forces). In these types of formations, the metallic electrode, whether it be a single member or an array of multiple members, can terminate at its lower extremity in the vadose zone, or can extend further into the capillary or saturated zones. Alternatively, the metallic electrode can be placed entirely in an underground water reservoir to decontaminate the water in the reservoir. The number of rods or other components of the metallic electrode, their length or depth of placement, and the spacing between them that will provide the optimum or most efficient decomposition of contaminants are not critical to the invention and will vary with such factors as the condition, quality, and composition of the soil, and the type of contamination as well as its source and mobility. In highly contaminated aquifers, the pore spaces in the aquifers may also contain organic liquids such as trichloroethylene, for example. Using as an example a metallic electrode that is an array of rods extending vertically into the soil formation, a preferred lateral spacing between the closest adjacent rods for most contaminated soil formations is from about 6 inches (15 cm) to about 120 inches (305 cm), and a more preferred spacing is from about 6 inches (15 cm) to about 36 inches (91 cm). A higher rate of decomposition can often be achieved by circulating fluid within the soil formation to increase the exposure of contaminants to electrode surfaces. Circulation can be achieved by conventional means, one example of which is by pumping the fluid from and re-injecting the fluid back to the soil formation.

The metallic electrode can have a surface layer of a magnesium-containing metal or it can be a solid magnesium-containing metal throughout. The term "magnesium-containing metal" is used herein to denote any metal that contains magnesium, i.e., either 100% magnesium metal or a magnesium-containing alloy. The most suitable magnesium-containing alloys are alloys in which magnesium is the component present in the greatest proportion. If the magnesium is only a surface layer, a more economical material can be used as the core. The core material will be one with sufficient structural integrity to support the electrode and avoid damage while the electrode is being lowered into the soil formation, but yet one that can be stably and securely clad with metallic magnesium. The magnesium, whether it be an outer layer or the entire electrode, can be solid or porous. Porous magnesium offers the advantage of greater surface area for a more extensive reaction or faster reaction rate, and the possibility of permitting flow of the contaminated fluids in the formation through the pores. In cases where porous magnesium is used, the porosity is not critical to the invention. In most cases, however, best results will be obtained with porosities (expressed as surface area per unit weight of the magnesium) of up to about 1 $m^2/g$, and preferably up to about 15 times the bulk external surface area of the electrode (the bulk external surface area of a rod electrode of radius r and height h, for example, being $2\pi rh$).

To complete the electrochemical reaction, a counter electrode is placed in the soil formation or aqueous medium. The material of construction of the counter electrode is not critical, although preferred materials are those that do not themselves react with or otherwise contaminate the soil formation or groundwater as a result of the electrochemical reaction. Conventional electrode materials such as carbon, graphite or platinum can indeed be used. The number of counterelectrodes used and their placement in the soil formation relative to the magnesium-containing electrodes will be determined by the number and placement of the magnesium-containing electrodes. Because the counterelectrodes do not take a direct part in the decomposition reactions of the halogenated hydrocarbons and their sole purpose is to complete the circuit for the transfer of electrons through the formation, the counterelectrodes can be fewer in number than the magnesium-containing electrodes, and their placement in the formation is not governed by the location or projected flow path of the contaminants. The choice of counter electrode material, number of counter electrodes, and the placement of the counterelectrodes will be fully within the routine skill of those experienced in electrochemistry and hydrology.

The electrochemical reaction can occur either continuously (by imposition of a constant or continuous electric potential) or intermittently (either as discrete pulses or as an oscillating potential). When pulses or an oscillating potential is used, the amplitude and frequency are not critical and can vary widely to achieve the optimal effect. Greater amplitudes will provide a faster renewal of metallic magnesium, which in some cases will result in a more efficient decomposition process or a faster rate of decomposition. Likewise, a higher frequency will promote a more continuous renewal of the metallic magnesium and possibly less physical deterioration of the magnesium surface. In most applications, the most effective and economical results will be achieved by the use of amplitudes of from about 2V to about 20V, preferably from about 3V to about 12V, and frequencies of from about 0.003 $sec^{-1}$ to about 0.3 $sec^{-1}$, preferably from about 0.006 $sec^{-1}$ to about 3.0 $sec^{-1}$. These intervals are not critical, however; the benefits of polarity reversal will be achievable in certain cases with only occasional reversals in polarity. A polarity that reverses on a repeating basis is particularly preferred, since it alternates between accelerating the reaction and electrochemically cleaning the electrode surface. A typical reversing polarity may range from a voltage alternating between about 2V and about –2V to a voltage alternating between about 20V to about –20V, or more preferably ranging from a voltage alternating between about 3V and about –3V to a voltage alternating between about 9V to about –9V. The polarity reversals need not be symmetric in time, however; irregular or intermittent reversals will serve as well. Pulses or oscillations, either regular or irregular, can have a square profile, a sine wave profile, a step-wise profile, or any other profile, and may alternate between a positive voltage and zero, or between a positive voltage and a negative voltage.

The electric potential between the two electrodes is imposed and maintained by any conventional generator, preferably one that is above ground. When either or both of the electrodes is present in multiple components, the components are preferably connected in parallel to minimize voltage drops. In general, the equipment and types of electrical connections are well within the skill of those knowledgeable in electrochemistry.

Organohalide contaminants that can be decomposed by the practice of this invention extend to a wide variety of species. Examples are carbon tetrachloride, chloroform, methylene dichloride, methyl chloride, methyl bromide, ethylene dichloride, chloroethylene, 1,1-dichloroethylene, 1,2-dichloroethylene, vinyl chloride, benzyl chloride, and polychlorinated biphenyls. Other examples will be readily apparent to those in the hydrocarbon processing and industrial waste processing industries. Examples of chromium (VI) contaminants that can be reduced by the practice of this invention are sodium dichromate, potassium dichromate, ammonium dichromate, and chromic acid.

The following examples are offered strictly for purposes of illustration.

EXAMPLE 1

Figure 2:
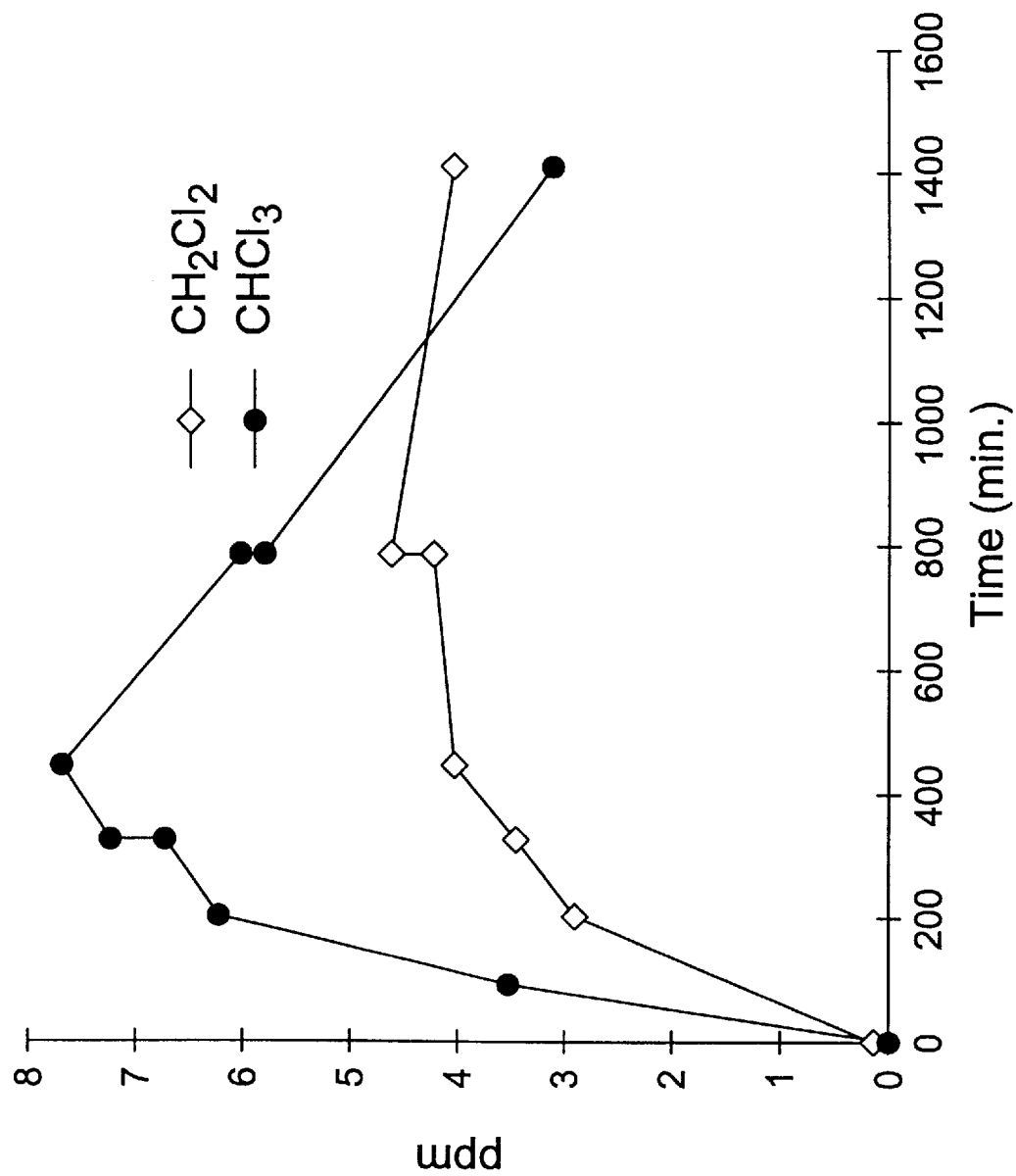
FIG. 2 is a repeat of the plot of FIG. 1 in which the vertical scale has been enlarged to show the production of $CHCl_3$ and $CH_2Cl_2$ arising from $CCl_4$ degradation.

An electrochemical cell was constructed using an 8-oz. glass jar whose lid was fitted with a magnesium rod measuring about 2 inches (5.1 cm) in length and about 0.25 inch (0.64 cm) in diameter, a carbon electrode, a double junction Ag/AgCl reference electrode, a septum, and a gas outlet port leading to a bubbler. The magnesium and carbon electrodes were joined to a potentiostat through an ammeter, and the magnesium and reference electrodes were joined to a voltmeter. The jar was charged with an aqueous solution of 797 ppm (by weight) carbon tetrachloride, and the voltage applied to the magnesium electrode was oscillated between +9 V and –9 V in 1-V increments with 30-second dwell times for each increment. The solution was periodically analyzed for its chlorinated hydrocarbon content by gas chromatography and mass spectrum analyses, and the results are plotted in FIGS. 1 and 2. FIG. 1 is a plot of the concentrations of carbon tetrachloride (filled squares), chloroform (filled circles), and methylene chloride (open diamonds) vs. time. FIG. 2 is an enlargement (expanded vertical scale) of FIG. 1 showing the chloroform and methylene chloride data. Collectively, these plots indicate that complete destruction of the carbon tetrachloride occurred in approximately 24 hours, and that the carbon tetrachloride is degraded to chloroform, which is in turn degraded to methylene chloride.

A control cell was run simultaneously, identical to the first except that the electrodes were not connected to a voltage source. The GC/MS analyses showed no degradation of the carbon tetrachloride.

Figure 3:
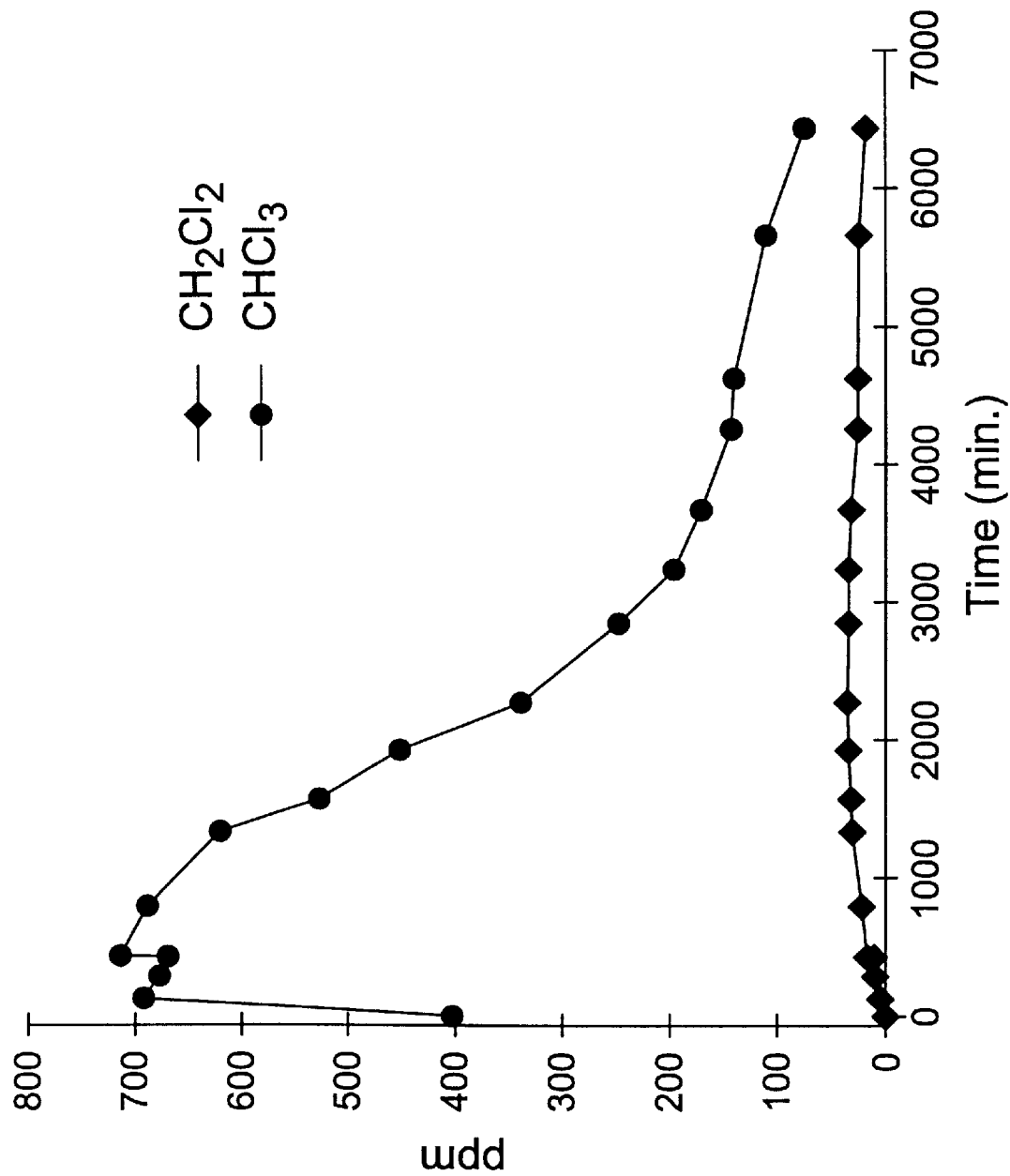
FIG. 3 is a plot of $CHCl_3$ concentration vs. time in an aqueous solution in an experiment similar to that of FIG. 1 and shows the degradation of $CHCl_3$.

A second experiment was conducted, identical to the first, except that the initial aqueous solution contained only chloroform at a concentration of about 750 ppm (by weight), and the magnesium electrode had half the surface area of the magnesium electrode used in the carbon tetrachloride experiment. The analyses of the aqueous solution as a function of time are shown in FIG. 3. The results indicate that the chloroform degradation required approximately 5 days, the difference apparently attributable to the different in magnesium electrode surface area. Again, a control run with no voltage applied resulted in no degradation of the chloroform.

EXAMPLE 2

Figure 4:
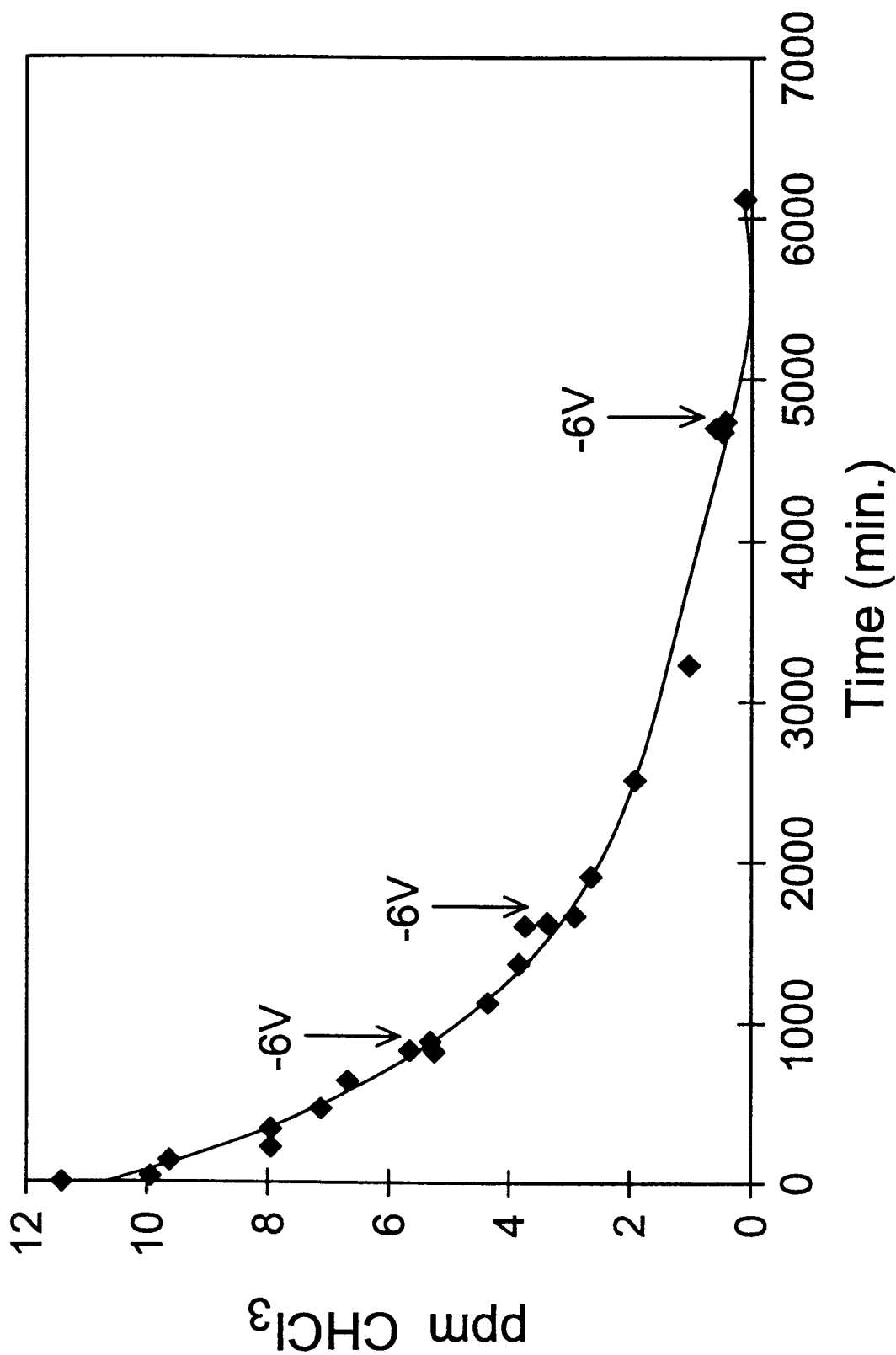
FIG. 4 is a plot of $CHCl_3$ concentration vs. time in an aqueous solution in a further experiment similar to that of FIG. 1, again showing the degradation of $CHCl_3$.

A cell similar to that of Example 1 but with magnesium and platinum electrodes was used on a 400-mL sample of chloroform-contaminated groundwater from a Superfund site. A potentiostatically controlled voltage of 6V was applied across the magnesium-platinum electrode pair for a period of 6,100 minutes (101 hours, 40 minutes), during which time the voltage was reversed to –6V for three 30-minute time intervals, at the 900-minute, 1700-minute and 4700-minute points (approximately). The liquid in the cell was periodically analyzed for its chloroform content by gas-liquid chromatography-mass spectrometry, and the results are plotted in FIG. 4. The plot shows that over a time period of 5,500 minutes, the chloroform concentration dropped steadily from approximately 11.5 ppm (by weight) to 0 ppm.

EXAMPLE 3

Figure 5:
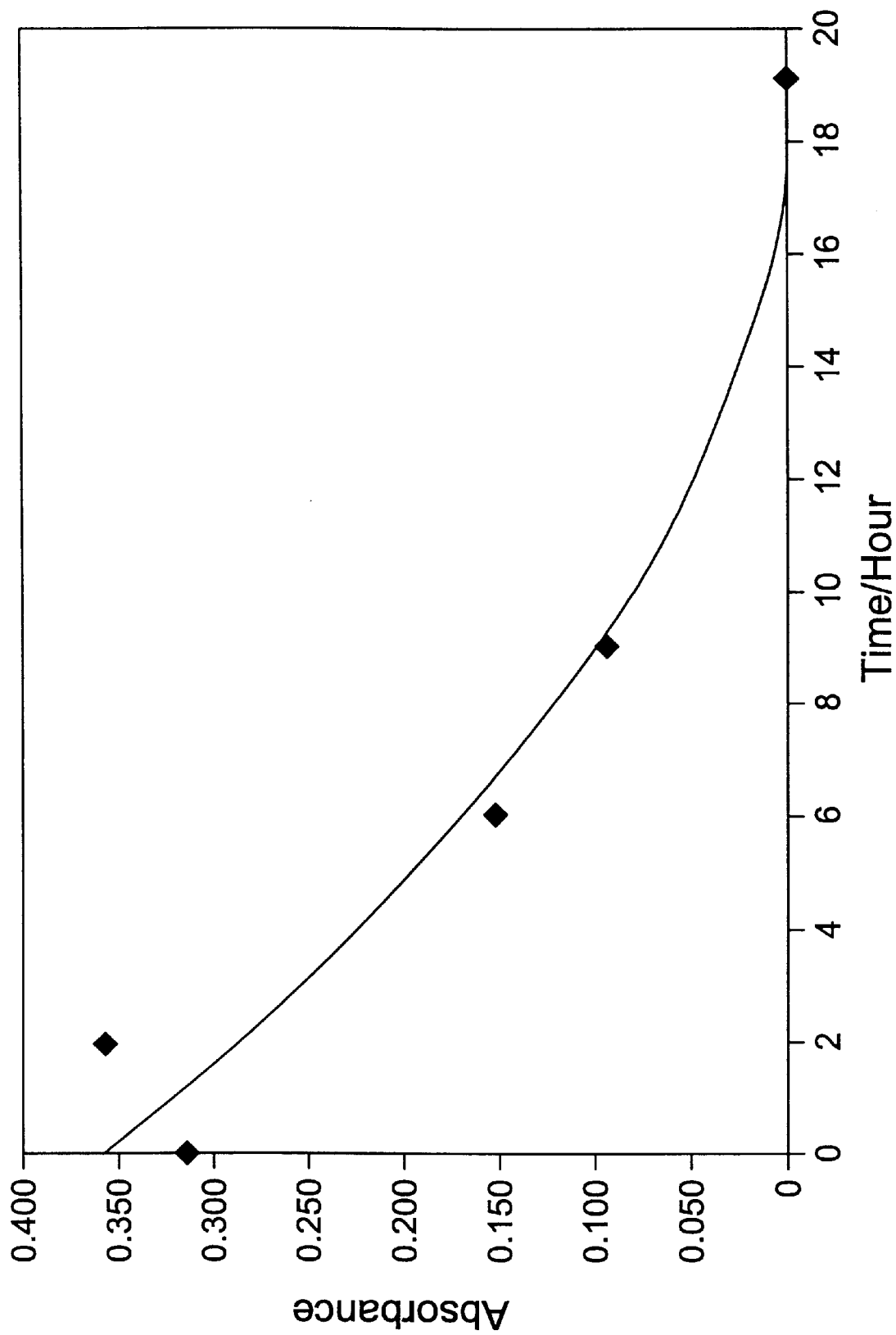
FIG. 5 is a plot of Cr(VI) concentration vs. time in an aqueous solution in an experiment utilizing the process of the present invention.

The cell used in Example 2 was used to obtain electrochemical reduction of Cr(VI) in an aqueous solution, without voltage reversal. The starting solution contained dissolved $K_2CrO_4$ at a concentration of $7.72 \times 10^{-5}$M, and the Cr(VI) concentration was monitored periodically over a nineteen-hour time period by absorbance at a wavelength that was selectively absorbed by Cr(VI) and not by either Cr(II) or Cr(III). The results are shown in FIG. 5, which shows that the Cr(VI) absorbance dropped steadily from 0.350 ASUC (absorbance units full scale) (about 8 ppm by weight) to 0 ASUC over a period of eighteen hours.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

We claim:

1. A method for treating a soil formation containing groundwater and a halogenated organic contaminant to decompose said contaminants, said method comprising:
    (a) placing a solid first electrode with an exposed surface of a magnesium-containing metal in said soil formation at a location where said exposed surface contacts both said groundwater and said contaminant;
    (b) placing a second electrode in said soil formation sufficiently close to said first electrode to permit the passage of electric charges through said soil formation between said first and second electrodes; and
    (c) imposing a voltage between said first and second electrodes to enhance the activity of the metallic magnesium of said first electrode in decomposing said halogenated organic contaminants.

2. A method in accordance with claim 1 in which said first electrode is comprised of a rod having an outer surface of magnesium metal.

3. A method in accordance with claim 1 in which said first electrode is comprised of a plurality of rods, each having an outer surface of magnesium metal.

4. A method in accordance with claim 3 in which (a) comprises spacing adjacent rods apart from each other by distances ranging from about 6 inches to about 120 inches.

5. A method in accordance with claim 3 in which (a) comprises spacing adjacent rods apart from each other by distances ranging from about 6 inches to about 36 inches.

6. A method in accordance with claim 1 in which (c) comprises imposing said voltage in continuous manner.

7. A method in accordance with claim 1 in which (c) comprises imposing said voltage in pulses.

8. A method in accordance with claim 7 in which said pulses have an amplitude of from about 2V to about 20V, and a frequency of from about 0.003 $sec^{-1}$ to about 0.3 $sec^{-1}$.

9. A method in accordance with claim 7 in which said pulses have an amplitude of from about 3V to about 12V, and a frequency of from about 0.006 $sec^{-1}$ to about 3.0 $sec^{-1}$.

10. A method in accordance with claim 7 in which said pulses range from a voltage alternating between about 2V and about −2V to a voltage alternating between about 20V to about −20V.

11. A method in accordance with claim 7 in which said pulses range from a voltage alternating between about 3V and about −3V to a voltage alternating between about 9V to about −9V.

12. A method in accordance with claim 1 in which said first electrode is comprised of a porous rod having a surface area of up to about 1 $m^2/g$.

13. A method in accordance with claim 1 in which said first electrode is comprised of a rod having a surface area ranging from that of said rod with zero porosity to one having a surface area of about 15 times that of said rod with zero porosity.

14. A method in accordance with claim 1 in which (c) comprises imposing a voltage between said first and second electrodes of repeatedly reversing polarity to electrochemically clean said first electrode.

15. A method in accordance with claim 1 further comprising circulating groundwater within said soil formation to increase exposure of said contaminant to said exposed surface of said first electrode.

16. A method for treating an aqueous medium containing dissolved Cr(VI) to reduce said Cr(VI) to Cr of an oxidation state lower than Cr(VI), said method comprising:
    (a) placing a solid electrode with an exposed surface of a magnesium-containing metal in said aqueous medium;
    (b) placing a second electrode in said aqueous medium sufficiently close to said first electrode to permit passage of electric charges through said aqueous medium between said first and second electrodes; and
    (c) imposing a voltage between said first and second electrodes to reduce said Cr(VI) to Cr of an oxidation state lower than Cr(VI).

17. A method in accordance with claim 16 in which said first electrode is comprised of a rod having an outer surface of magnesium metal.

18. A method in accordance with claim 16 in which (c) comprises imposing said voltage in continuous manner.

19. A method in accordance with claim 16 in which said voltage of (c) is from about 2V to about 20V.

* * * * *